Patented May 18, 1937

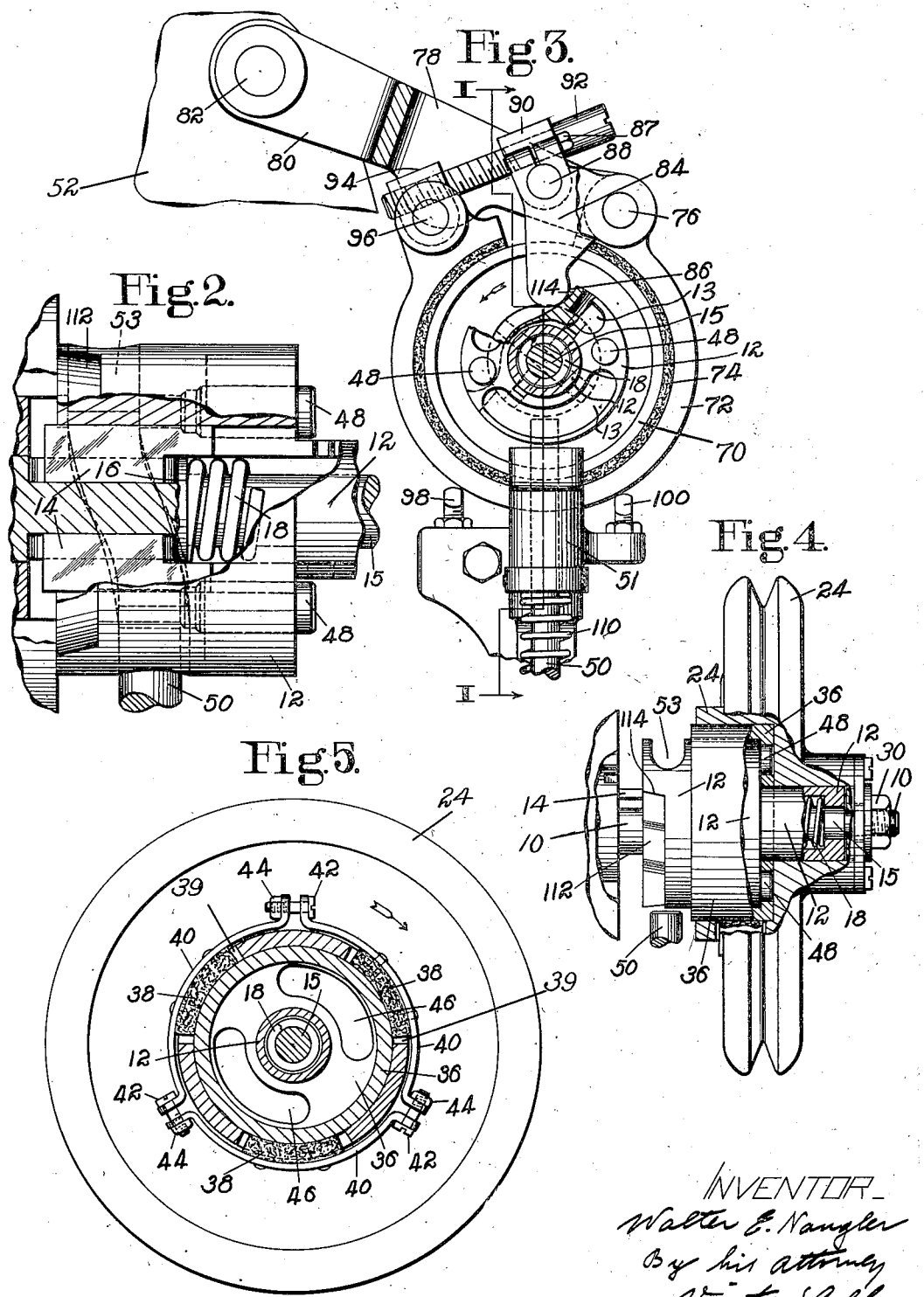

2,080,544

UNITED STATES PATENT OFFICE 2,080,544

STARTING AND STOPPING MECHANISM

Walter E. Naugler, Beverly, Mass., assignor to United Shoe Machinery Corporation, Paterson, N. J., a corporation of New Jersey Application October 11, 1934, Serial No. 747,991

9 Claims. (Cl. 192—148)

This invention relates to starting and stopping mechanisms and is herein illustrated as embodied in mechanism developed for stopping and starting a machine for lacing the uppers of shoes preparatory to lasting. The illustrated mechanism was designed particularly for use in a machine for the above purpose disclosed in an application for Letters Patent of the United States Serial No. 21,011, filed May 11, 1935, in the name of Joseph Fossa. The mechanism is, however, applicable to many other types of machines.

It is an object of this invention to provide an improved starting and stopping mechanism by which a machine may be started and be gradually brought up to normal operating speed without objectionable shock and by which, after the machine has been slowed down gradually to a moderate speed, the machine will be brought to a stop in a definite position in its cycle of operation, likewise without objectionable shock.

With the above object in view, a feature of the invention consists in the combination, with a suitable stop mechanism, of a frictional driving connection, the friction of which is preferably adjustable, a positive driving connection, preferably between the frictional driving connection and the shaft of the machine to be driven, and means for rendering the positive connection either operative or inoperative, the frictional and positive connections acting mutually, when the positive connection is rendered operative, frictionally to connect the source of power, such as a rotating pulley, with the shaft of the machine to be driven. When so connected, slippage will occur initially in the frictional driving connection as the machine starts to be driven but, as the machine gathers speed, this slippage is progressively decreased to zero and the friction of the frictional driving connection then serves to drive the machine at the speed of the pulley, with the machine under normal load, although permitting slippage so as to prevent damage to the machine if the machine should become overloaded.

In order to slow down the machine gradually simultaneously with rendering inoperative the positive driving connection, and subsequently stop its shaft in a definite angular position, another feature of the invention consists of a cam, a cam lever and associated mechanism which act to apply a brake with gradually increasing force and in which the cam track of the cam is constructed with a stop shoulder which cooperates with the cam lever in such a manner as to serve as a positive stop for stopping the machine shaft in a definite angular position. With this feature, means are provided to move the cam lever and cam track relatively into and out of operative engagement with each other.

Another feature of the invention consists in a single member, such as a sleeve, arranged to slide from one position to another upon the shaft, either automatically or under control of the operator, so that, when slid into one position, it disconnects the brake members and renders the positive driving connection operative between the machine shaft and the frictional driving connection, whereby the friction will drive the machine, and which member, when slid into the other position, disconnects the positive driving connection from the frictional driving connection and operates the above mentioned braking and stopping mechanism.

The invention will be understood upon reference to the accompanying drawings, in which Fig. 1 is a front sectional view, taken on the line I—I of Fig. 3, looking in the direction of the arrows, and with the parts in a position about 90° before stopping takes place;

Fig. 2 is a similar view of a portion of the mechanism shown in Fig. 1 but with the parts in stopped position;

Fig. 3 is a sectional view, on a reduced scale, taken on the line III—III of Fig. 1, looking in the direction of the arrows and showing the brake mechanism in detail;

Fig. 4 is a front elevation, on a reduced scale, of the parts in driving position, with some of the parts cut away to show certain parts in section, and Fig. 5 is a sectional view, on a reduced scale, taken on the line V—V of Fig. 1, and showing the frictional driving connection.

Figure 1:
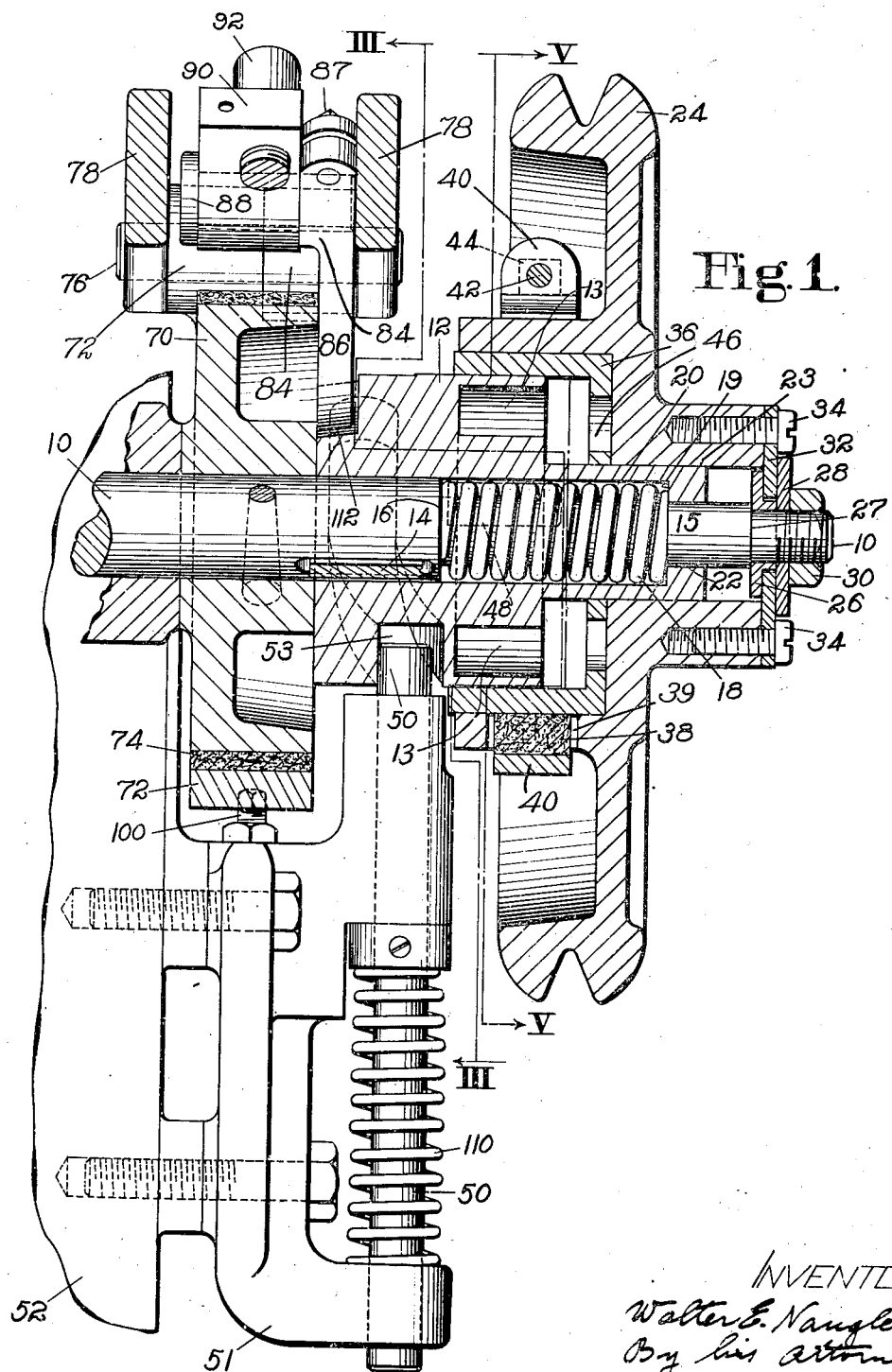

Referring to the drawings, 10 is the main shaft of the machine to be driven and stopped by the mechanism of the present invention. Mounted to turn with the shaft and to slide thereon is a sleeve 12, which has two arcuate recesses 13 cast in it to reduce its weight. The shaft and sleeve are connected together by keys 14, secured in the shaft and loosely fitting grooves (not shown) in the sleeve. The shaft is of reduced diameter toward its outer end, as shown at 15. This change in size of the shaft produces a shoulder 16 against which one end of a compression spring 18 rests, the spring surrounding this reduced portion of the shaft. The sleeve 12 is provided with a bore 20 which is a sliding fit on the main portion of the shaft 10 and this bore provides a space within the sleeve for the spring 18. The opposite end of the spring rests against the end 19 of the bore 20. The portion of the sleeve extending beyond the end of the bore is drilled to form a sliding fit at 22 on the reduced portion 15 of the shaft. The compression spring 18 thus tends to force the sleeve outwardly on the shaft when permitted to do so. Mounted to turn on a reduced portion 23 of the sleeve is a loose pulley 24. The pulley is maintained in longitudinal position relatively to the shaft by means of an easily assembled and disassembled circular tongue and groove connection. The groove is formed between a collared bushing 26, resting against a second shoulder 27 on the shaft, and a washer 28 which is clamped against the bushing 26 by means of a nut 30 threaded upon the extreme outer end of the shaft 10. The tongue, which is a running fit in the groove, is formed by a washer 32 secured to the hub of the loose pulley 24 by means of screws 34.

Mounted on the loose pulley 24, in a suitable recess, is a cup-shaped bushing 36. This bushing is frictionally connected to the loose pulley by means of friction members 38 (see Figs. 1 and 5) which are positioned in slots 39 in the pulley and which are riveted to a clamp ring 40 made in sections and connected by means of adjusting screws 42 and nuts 44. This frictional driving connection between the loose pulley 24 and the bushing 36 will be referred to later. The outer end of the bushing 36 is provided with arcuate slots 46 into which the ends of pins 48, securely mounted in bores in the sleeve 12, will enter when the sleeve 12 is permitted to slide along the shaft outwardly by means of its spring 18.

The position of the sleeve 12 is controlled by means of a controlling rod 50 mounted to slide vertically in a bracket 51 secured to the frame 52 of the machine. This rod 50 may be either operator or machine controlled and cooperates with a cam slot 53 in the sleeve 12. Assuming that the upper end of the rod 50 is in its uppermost position or in the slot 53, with the machine in stopped position, it will be seen that, upon withdrawing the rod downwardly from the cam slot 53, the spring 18 will slide the sleeve 12 longitudinally along the shaft 10 toward its outer end so that, as the loose pulley revolves, carrying with it by the frictional driving connection the cup-shaped bushing 36 with the arcuate slots 46, the ends of the pins 48 will enter these slots. When the rear ends of the slots 46 strike the pins 48, a positive driving connection is established between them, or between the bushing and the sleeve, which connection will drive the sleeve from the rotating pulley 24 and thereby the shaft to which the sleeve is non-rotatably connected. However, the friction members 38 are intended to be so adjusted by means of the screws 42 that slippage will take place in the frictional driving connection between the bushing 36 and the pulley 24 upon starting and also for a short period thereafter. However, this friction should be adjusted so that it will maintain the shaft 10 and the machine connected thereto at its proper speed without slippage after such speed has been attained with full load on the shaft. With such an adjustment the slippage in this frictional connection will gradually decrease to zero as the shaft gathers speed. Obviously, when this slippage is zero, the shaft and the machine will be driven at the speed of the pulley. Furthermore, if for any reason the machine is given an excessive load, the friction, being properly adjusted, will not be sufficient to drive the machine and cause injury to its parts.

In a large number of machines it is necessary to stop them in a definite angular position and, in order to meet this requirement in the present invention, a novel brake and stopping device is provided to operate with said positive driving connection. This brake and stopping device are best shown in Fig. 3, although some of its features are shown in Fig. 1. This mechanism will now be described.

Secured to the shaft 10 is a brake drum 70 and surrounding the drum is a brake band 72 which has frictional material 74 secured to its inner face. One end of the brake band 72 is freely mounted on a pin 76, passing through the bifurcated end 78 of a lever 80. The lever 80 is pivotally mounted on a fixed pivot 82 secured, preferably, to a portion of the machine frame 52. Also loosely mounted on the pin 76 is a cam lever 84 having a cam face 86. Mounted in the cam lever 84, and secured thereto by a clamp screw 87, is a pin 88 which is parallel to the pin 76. Mounted to swivel on the pin 88 is a block 90 having an aperture through which the threaded portion of an adjusting screw 92 passes freely. This screw is threaded through a block 94 connected by means of a pivot pin 96 to the opposite end of the brake band 72. The diameter of the brake band, i. e. its curvature, is determined by adjusting the screw 92 and, in order to maintain the band in concentric relation with the brake drum, two adjustable stop screws 98 and 100 are provided on which two separated portions of the brake band rest. These stop screws and the pivotal mounting of the band on the lever 80 and the pivotal mounting of this lever itself permit the brake band to float freely without normally touching the brake drum 72.

When it is desired to stop the machine, the control rod 50 is permitted to be lifted by a spring 100, either automatically or by control of the operator, and the end of this rod engages the outer surface of the sleeve 12 until the cam slot 53 reaches such a position that the upper end of the rod will enter the cam slot. The shape of the cam slot is such that, upon continued rotation, the sleeve 12 is brought inwardly (to the left in Fig. 1) to disconnect the pins 48 from the ends of the slots 46, thus stopping the drive of the shaft from the pulley 24. As this disconnection takes place, a second cam 112 cut on the sleeve 12, has become positioned beneath the cam lever 84 so that the cam face 86 thereon starts to ride upon the track of the cam 112. The cam face 86 is lifted by a gradual rise in the cam track which causes the cam lever 84 to pull on the adjusting screw 92, through the pin 88 and swivel block 90. The screw 92 then pulls on the block 94 and pivot 96 to contract the brake band so that its friction surface 74 engages the brake drum 70 with increasing force to slow down the rotation of the shaft. The end of the cam track is steep to form a shoulder or abutment 114 which, when it strikes the cam face 86, stops the machine in a definite angular position. As the speed has been reduced gradually by the increasing force by which the brake band has been contracted, this final stopping at a definite angular position is without substantial shock.

When the machine is started again by the withdrawal of the controlling rod 50 from the cam slot 53, the spring 18 in sliding the sleeve 12 (to the right in Fig. 1) not only causes the pins 48 to engage the slots 46 but it also causes the cam 112 on the sleeve to withdraw from beneath the cam lever 84, releasing the brake which then expands due to the elasticity of the brake band 72 to clear the brake drum.

Having described my invention, what I claim as new and desire to secure by Letters Patent of the United States is:

1. A starting and stopping mechanism having, in combination, a shaft, a loose pulley, a frictional driving connection, a positive driving connection, means for rendering the positive driving connection either operative or inoperative, said driving connections acting mutually, in series, when the positive connection is rendered operative, to connect the pulley and the shaft so that the pulley will start the shaft and drive it, after the slippage in the frictional connection has progressively decreased to zero, at its normal speed, a brake for slowing down the shaft, mechanism for applying the brake with continuously increasing force, and a stop for finally stopping the shaft in a definite angular position while said force is continuously increasing.

2. A starting and stopping mechanism having, in combination, a shaft, a brake member secured thereto, a contractible brake member adapted to engage the first mentioned brake member for applying a braking force, a member mounted to turn with the shaft and having a cam track, a cam lever having a surface to engage the cam track, mechanism associated with the cam lever for contracting the contractible brake member with continuously increasing force to slow down the shaft, and a stop shoulder at the end of the cam track, said surface on the cam lever engaging said shoulder to stop the shaft in a definite angular position while said force is continuously increasing.

3. A starting and stopping mechanism having, in combination, a shaft, a brake member secured thereto, a second brake member adapted to engage the first mentioned brake member for applying a braking force, a member mounted to turn with the shaft and having a cam track, a cam lever having a surface to engage the cam track, mechanism associated with the cam lever for causing engagement of the two brake members with increasing force to slow down the shaft, a stop shoulder at the end of the cam track, said surface on the cam lever engaging said shoulder to stop the shaft in a definite angular position, and means to move the cam longitudinally on the shaft into and out of operative engagement with the cam lever.

4. A starting and stopping mechanism having, in combination, a shaft, a brake drum secured thereto, a floating contractible brake band surrounding said drum, adjustable means for changing the curvature of the band to maintain it normally in substantial concentric relation with the drum and out of contact therewith, a cam mounted to turn with the shaft, a cam lever cooperating with the cam for contracting the brake band with increasing force into contact with the brake drum to reduce the speed of the shaft, and a stop on the cam for finally stopping the shaft in a definite angular position.

5. A starting and stopping mechanism having, in combination, a shaft, a brake drum secured thereto, a floating contractible brake band surrounding said drum, adjustable means for changing the curvature of the band to maintain it normally in substantial concentric relation with the drum and out of contact therewith, a cam mounted to turn with the shaft and to slide thereon, a cam lever cooperating with the cam for contracting the brake band with increasing force into contact with the brake drum to reduce the speed of the shaft, a stop on the cam for finally stopping the shaft in a definite angular position, and means to slide the cam along the shaft out of contact with said cam lever to release the brake as the shaft is started.

6. A starting and stopping mechanism having, in combination, a shaft, a loose pulley mounted to turn about the shaft, a cup-shaped bushing mounted on the pulley, a frictional driving connection between the pulley and the bushing, a sleeve mounted to turn with the shaft and to slide thereon between a stopping position and a driving position, a spring for sliding the sleeve into one of said positions, a cam on the sleeve for sliding it into the other position against the action of the spring, means cooperating with the cam to control movement of the sleeve, and a positive driving connection between the bushing and sleeve operative only when the latter is in driving position, whereby, when the sleeve is in driving position, the pulley will start the shaft and drive it, after the slippage in the frictional connection has progressively decreased to zero, at its own speed.

7. A starting and stopping mechanism having, in combination, a shaft, a loose pulley mounted to turn about the shaft, a cup-shaped bushing mounted on the pulley, a frictional driving connection between the pulley and the bushing, a sleeve mounted to turn with the shaft and to slide thereon between a stopping position and a driving position, a spring for sliding the sleeve into driving position, a cam on the sleeve for sliding it into stopping position against the action of the spring, means cooperating with the cam to control movement of the sleeve, and a positive driving connection between the bushing and sleeve operative only when the latter is in driving position, whereby, when the sleeve is in driving position, the pulley will start the shaft and drive it, after the slippage in the frictional connection has progressively decreased to zero, at its own speed.

8. A starting and stopping mechanism having, in combination, a shaft, a brake member secured thereto, a second brake member adapted to engage the first mentioned brake member for applying a braking force, a loose pulley, a member mounted on the pulley, a frictional driving connection between the pulley and the member, a sleeve mounted to turn with the shaft and to slide thereon from one position to another, means on the sleeve, which are operative only when the sleeve is in one of said positions, for positively connecting the member and the sleeve, whereby the pulley, operating through said frictional connection and said means, will start the shaft and drive it, after the slippage in the frictional connection has progressively decreased to zero, at its own speed, additional means on the sleeve, which are operative only when the sleeve is in the other of said positions, for causing engagement of the two brake members with increasing force to slow down the shaft, and a stop for finally stopping the shaft in a definite angular position.

9. A starting and stopping mechanism having, in combination, a shaft, a loose pulley mounted to turn about the shaft, a member mounted on the pulley, a frictional driving connection between the pulley and the member, a sleeve mounted to turn with the shaft and to slide thereon between a stopping position and a driving position, a spring for sliding the sleeve into driving position, a cam on the sleeve for sliding it into stopping position against the action of the spring, means cooperating with the cam to control movement of the sleeve, a positive driving connection between the member and sleeve operative only when the latter is in driving position, a brake drum secured to the shaft, a contractible brake band surrounding said drum, a second cam on the sleeve, a cam lever to cooperate with the second cam, and a stop on the second cam, all being so constructed and arranged that, when the sleeve is in said driving position, the pulley will start the shaft and drive it, after the slippage in the frictional connection has progressively decreased to zero, at its own speed, and when the sleeve is slid into stopping position the second cam and the cam lever will contract the brake band with increasing force in braking engagement with the drum so as to reduce the speed of the shaft, and the stop on the cam will finally stop the shaft in a definite angular position, and afterward, when the sleeve is slid again into driving position, the second cam will slide from under its cam lever to release the brake.

WALTER E. NAUGLER.